Sept. 23, 1969 W. P. IANNUZZI 3,469,022
COMBINATION CHROMINANCE AMPLIFIER, BURST AMPLIFIER, AND BURST GATE CIRCUIT FOR A COLOR TELEVISION RECEIVER
Filed Oct. 1, 1965
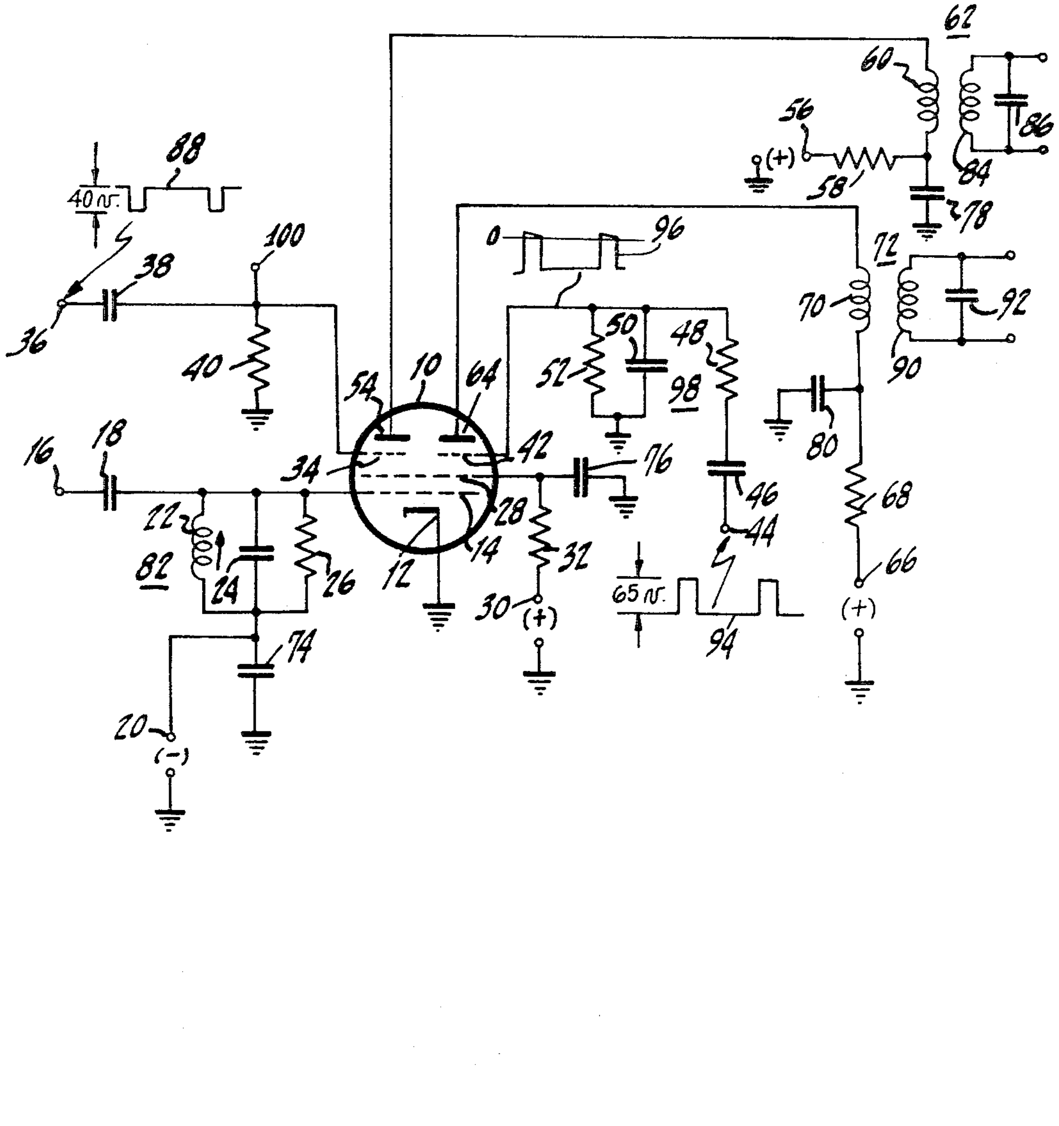
INVENTOR.
WILLIAM P. IANNUZZI
BY Eugene M. Whitacre
Attorney

United States Patent Office 3,469,022
Patented Sept. 23, 1969

3,469,022
COMBINATION CHROMINANCE AMPLIFIER, BURST AMPLIFIER, AND BURST GATE CIRCUIT FOR A COLOR TELEVISION RECEIVER

William P. Iannuzzi, Haddonfield, N.J., assignor to RCA Corporation, a corporation of Delaware
Filed Oct. 1, 1965, Ser. No. 492,119
Int. Cl. H04n *5/42, 5/44*
U.S. Cl. 178—5.4 3 Claims

ABSTRACT OF THE DISCLOSURE

A split-pentode vacuum tube having a first amplifying half, a second amplifying half, and a common signal input electrode is employed in a combination chrominance amplifier, burst amplifier, and burst gate circuit for a color television receiver. Chrominance and burst signal information are coupled to the common electrode and amplified by the first and second halves, respectively. However: (1) a negative flyback pulse derived during the burst interval is used to key-off the chroma amplifying half during that interval; and (2) a positive flyback pulse also derived during the burst interval is used to key-off the burst amplifying half during the chroma signal interval. The configuration permits a simplified color reproducing system to be constructed, and at a substantial reduction in cost.

This invention relates to color television receivers and, more particularly, to a combination chrominance amplifier, burst amplifier, and burst gate circuit for use in such apparatus.

In the standardized color television system, four types of information are transmitted from the signal source. One type of signal information is the line and field deflection scanning synchronization information. A second type of information represents the brightness or luminance signal which conveys the black and white or monochrome image information. A third type of information is a chrominance signal containing a color carrier of 3.58 megacycles mean frequency, which is amplitude-modulated in accordance with the degree of saturation of the color being transmitted and which is phase-modulated in accordance with its hue. Inasmuch as some of the color information is represented by the phase of this color carrier, it is apparent that some reference wave must be transmitted in order to give a basis for comparison—thus, the fourth type of signal information. This fourth type of information is in the form of at least eight cycles of color synchronizing bursts transmitted during the blanking interval for each of the scanning lines and is used to provide reference phase information.

In many present day color television receiver systems, the modulated color carrier signal is separated from the composite color television signal, amplified in a bandpass amplifier, and coupled to the color demodulator circuits. The color synchronizing bursts are also separated from the composite signal, amplified in a separate burst amplifier, and used to synchronize a reference carrier oscillator in the receiver, which oscillator develops a reference wave having a fixed phase with respect to the cycles in the burst. This reference wave is then coupled to the color demodulator circuits to synchronously demodulate the color carrier signal for the recovery of the color representative intelligence signals. The result of the synchronous demodulation of the color carrier are so called "color difference" signals which, when combined with the brightness or luminance signal, produce respective signals representative of the primary colors in which the image reproduction is to be effected. The brightness and color difference signals are then impressed upon the tricolor kinescope image reproducing apparatus as three different video signals representing the image colors.

In addition to distinguishing and separately utilizing these information signals to control various portions of the receiver, it is also necessary to prevent certain ones of these signals from appearing in certain circuits which are intended to be responsive to others of these signals. For example, for quality performance, the chrominance signals should not appear in the reference carrier oscillator circuits, because they may interfere with the synchronization of the reference wave with the receiver color burst and produce, as a result, incorrect demodulation of the color carrier. These signals should also be prevented from entering the reference carrier oscillator circuits to ensure the accuracy of the automatic chrominance control voltage (developed by the phase detector unit included therein) used for controlling the gain in the chrominance channel in accordance with the strength of a received color television signal. Similarly, the color burst signals should not appear in the color demodulator circuits because they may cause the kinescope to light up during the blanking interval of the scanning lines, as well as interfere with the operation of any black-level setting apparatus included therein. In presently existing color television receivers, removal of the chrominance signal from the reference carrier oscillator circuits is commonly accomplished by means of a burst gate circuit which renders the burst channel effectively inoperative during the chrominance signal interval of the received television signal. Removal of the color burst signal from the color demodulators, on the other hand, is commonly accomplished by "gating off" the chrominance amplifier, and thereby rendering the chrominance channel inoperative during the color burst interval of the received signal.

It is an object of the present invention to provide a one-tube circuit arrangement for performing the aforementioned amplifying and removing functions, i.e. for amplifying the chrominance signal information, for amplifying the burst signal information, for preventing the chrominance signals from appearing in the reference carrier oscillator circuits and for preventing the color burst signals from appearing in the color demodulator circuits.

As will become clear hereinafter, a signal-tube arrangement of this type, constructed in accordance with the invention, includes a split-pentode amplifier, one-half of which is gated so as to operate and provide amplification during the chrominance signal interval of a received television signal, while the other half is gated so as to operate and provide amplification during the color burst interval of the received signal.

For a better understanding of the present invention together with further objects thereof, reference is had to the following description, taken in connection with the accompanying drawing, and its scope will be pointed out in the appended claims.

In the drawing, there is shown one form of single-tube, multi-function circuit arrangement according to the principles of the invention. A split-pentode amplifier tube 10, of the 6BU8 variety for example, is included having: (a) a cathode electrode 12 connected to a source of reference potential, such as ground; (b) a control grid electrode 14 connected to an input signal supply terminal 16 through a capacitor 18 and to a negative potential supply terminal 20 through a bandpass filter 82 including a variable inductor 22, a capacitor 24, and a resistor 26 connected in parallel; (c) a screen grid electrode 28 connected to a positive potential supply terminal 30 through a resistor 32; (d) a first suppressor grid electrode 34 connected to a negative pulse supply terminal 36 through a capacitor 38 and to ground potential through a resistor 40; (e) a second suppressor grid electrode 42 connected to a positive pulse supply terminal 44 through a capacitor 46 and a resistor 48 in series and to ground potential through a network consisting of a capacitor 50 and a resistor 52 in parallel; (f) a first anode electrode 54 connected to a positive potential supply terminal 56 through a resistor 58 and the primary winding 60 of a chrominance transformer 62 in series; and (g) a second anode electrode 64 connected to a positive potential supply terminal 66 through a resistor 68 and the primary winding 70 of a burst transformer 72 in series. Radio frequency by-pass capacitors 74, 76, 78, and 80 are also included and are connected as shown.

In the drawing: (a) the input signal supply terminal 16 may represent the output terminal of a stage of video amplification of a known type of color television receiver, at which terminal there appears a signal of composite waveform containing the chrominance, the color burst, the luminance, and the synchronizing signal information; (b) the negative pulse supply terminal 36 may represent that terminal of a tapped winding on the horizontal output transformer of the receiver at which negative flyback pulses of voltage appear during the color burst interval of the composite signal; and (c) the positive pulse supply terminal 44 may represent that terminal of the tapped winding at which positive flyback pulses of voltage appear during the color burst intervals.

Understanding first that the left-half portion of the split-pentode 10—the half containing the first suppressor grid 34 and the first anode 54—represents part of the chrominance amplifier circuitry of the present invention, the operation of the circuit just described is as follows. A composite color television signal containing chrominance, color burst, luminance, and synchronizing information is supplied at input signal terminal 16 and coupled through capacitor 18. Bandpass filter 82 is chosen to effectively select the chrominance and color burst signal components from the composite signal, to the relative exclusion of the luminance and synchronizing signal components, and to couple these signals from the capacitor 18 to the control grid 14. The potentials supplied at terminals 20, 30, and 56 are so chosen that during the chrominance signal interval, the left-half portion of the split-pentode 10 conducts and develops an amplified chrominance signal at the first anode 54. Consequently, an amplified chrominance signal is developed across the primary winding 60 of the chrominance transformer 62, the secondary winding 84 of which is tuned, by means of a capacitor 86 connected in parallel therewith, to approximately the frequency of the color carrier signal. As was previously mentioned, however, negative pulse terminal 36 supplies negative flyback pulses during the color burst intervals of the compoiste signal. These pulses, indicated in the waveform 88 as being of 40 volts peak-to-peak magnitude for example, are coupled through the time constant network including capacitor 38 and resistor 40 to the suppressor grid 34. The time constant of the capacitor 38 and the resistor 40, and the magnitude of the negative flyback pulses, are chosen such that these pulses develop a substantial negative bias at the suppressor grid 34 during those color burst intervals, which bias is sufficient to cut-off the left-half portion of the pentode 10. These negative flyback pulses are therefore effective to disable the chrominance channel ad prevent the color bursts coupled to the control grid 14 from reaching the chrominance output circuits and, more particularly, from reaching the color demodulators of the receiver. The chrominance signal coupled to the control grid 14, on the other hand, is amplified by the left-half portion of the pentode 10 during the chrominance signal interval, there being no negative flyback pulses supplied by terminal 36 during that time. This amplified chrominance signal is not prevented, therefore, from reaching the color demodulators (connected across the capacitor 86, although omitted from the drawing for the sake of simplicity), wherein desired color difference signals are produced in a suitable manner. It is in this manner that the one-tube circuit arrangement of the invention amplifies the chrominance signal information and prevents the color burst signals from appearing in the color demodulator circuits.

Understanding next that the right-half portion of the split-pentode 10—the half containing the second suppressor grid 42 and the second anode 64—represents part of the burst amplifier circuitry of the present invention, the further operation of the circuit shown in the drawing is as follows. The potentials supplied at terminals 20, 30, and 66 are so selected that during the color burst intervals, the right-half portion of the split-pentode 10 conducts and develops an amplified burst signal at the second anode 64. Consequently, an amplified burst signal is developed across the primary winding 70 of the burst transformer 72, the secondary winding 90 of which is tuned by means of a capacitor 92 connected in parallel therewith, to the frequency of the color bursts. As was previously mentioned, however, positive pulse terminal 44 supplies positive flyback pulses during the color burst intervals of the composite signal. These pulses, indicated in the waveform 94 as being of 65 volts peak-to-peak magnitude for example, are coupled through the time constant network 98, including capacitors 46 and 50 and resistors 48 and 52, to the suppressor grid 42. Assuming that capacitor 46 is much larger in value than capacitor 50 and that resistor 48 is many times smaller in value than resistor 52 (see tabulated component values below), the signal developed at the suppressor grid 42, i.e. across capacitor 50, in response to these flyback pulses has the general characteristics indicated in the waveform 96. During the color burst intervals of the composite signal, the network 98 presents a first time constant $T_1$, a charge time constant, determined essentially by resistor 48 and capacitor 50 such that the signal developed at the grid 42 appears as shown. As is readily apparent, the positive excursions of this signal are effectively limited by the diode action of the right-half of the split-pentode 10, which, as was previously mentioned, is conductive during these intervals. The amplified color bursts coupled to the control grid 14 during the color burst interval are not prevented, therefore, from reaching the reference oscillator circuits of the receiver and produce therein, in any suitable manner, the reference wave used to synchronously demodulate the color carrier signal. Although omitted from the drawing for the sake of simiplicity, it will be understood that these circuits are connected across the capacitor 92.

Resistor 48 and capacitor 50 are also chosen so that the trailing edge excursion of the positive flyback pulse at terminal 44 produces a corresponding and significant excursion below the zero volt axis at the suppressor grid 42, sufficient to bias off the right-half portion of the split-pentode 10 at that time. Following the trailing edge excursion, the network 98 presents a second time constant $T_2$, a discharge time constant, determined essentially by resistor 48 and capacitor 46. This time constant is substantially greater than the first time constant $T_1$ and is effective to maintain the suppressor grid 42 at a significant negative potential during the entire inter-burst interval, as shown in the waveform 96. During this inter-burst or chrominance signal interval, therefore, the right-half portion of the split-pentode 10 is cut-off. The chrominance signal coupled to control the grid 14 during this chrominance signal interval is thus prevented from reaching the reference oscillator circuits, the burst channel being effectively disabled at this time. It is in this manner that the one-tube circuit arrangement of the invention amplifies the color burst signal information and prevents the chrominance signal from appearing in the reference oscillator circuits.

The following circuit constants are presented as being illustrative of values that may be utilized in the one-tube arrangement shown in the drawing:

| | | |
|---|---|---|
| Tube 10 | | 6BU8 |
| Capacitor 18 | micromicrofarads | 68 |
| Capacitor 24 | do | 10 |
| Capacitor 38 | microfarads | .01 |
| Capacitor 46 | do | .01 |
| Capacitor 50 | micromicrofarads | 680 |
| Capacitor 74 | microfarads | .1 |
| Capacitor 76 | do | .01 |
| Capacitor 78 | do | .01 |
| Capacitor 80 | do | .01 |
| Resistor 26 | kilohms | 10 |
| Resistor 32 | do | 7.5 |
| Resistor 40 | do | 10 |
| Resistor 48 | do | 5.6 |
| Resistor 52 | megohms | 2.2 |
| Resistor 58 | kilohms | 8.2 |
| Resistor 68 | do | 1.0 |
| Potential supplied at terminal 20 | volts D-C | −3.0 |
| Potential supplied at terminal 30 | do | +270 |
| Potential supplied at terminal 56 | do | +350 |
| Potential supplied at terminal 66 | do | +350 |

It may be thus be seen that the present invention provides a relatively simple and, consequently, inexpensive yet highly efficient one-tube circuit arrangement which permits independent amplification of the chrominance and color burst signals, which prevents the chrominance signal from entering the reference oscillator circuits and interfering with the synchronization of the reference wave with the received color burst and with the development of an automatic chrominance control voltage, and which further prevents the color burst signals from entering the color demodulators and causing the tri-color kinescope to light up during the blanking interval of the scanning lines and interfering with the operation of any black-level setting apparatus included therein.

Besides permitting a simplified color reproducing system to be constructed, and at a substantial reduction in cost, the present invention provides still another feature. Present day color television receivers often employ so called "color killer" circuits to arrest or disable operation of the chrominance channel during the reception of a monochrome broadcast in order to prevent spurious color effects in the reproduced image. Each of these color killer circuits operates, by and large, to develop a first control voltage for biasing "off" the chrominance channel during reception of a black and white signal, for example, and second control voltage for rendering the chrominance channel operative during the reception of a color television signal. In a manner well known and understood, these control voltages are often developed in response to the color synchronizing bursts in the received signal—the first control voltage above being developed in the absence of the color bursts and the second control voltage being developed in the presence of the bursts. With the split-pentode arrangement of the present invention, such action can be obtained quite easily, simply by coupling the control voltage developed by the color killer circuits—represented as terminal 100 in the drawing—to the suppressor grid 34 of the vacuum tube 10 and by causing that voltage to be sufficiently negative only in the absence of the color bursts, i.e. during monochrome reception, to cut off the left-half or chrominance amplifier portion of that tube. It will be noted that the right-half or burst amplifier portion of the vacuum tube 10 is not affected by such action and, as a result, can serve as the input signal source for the color killer circuit.

What is claimed is:

1. In a color television receiver adapted to receive a video signal including during each scan line a luminance portion and a chrominance portion, and including between successive scan lines a synchronizing pulse and a burst of oscillations at a color carrier frequency, a combination chrominance amplifier, burst amplifier, and burst gate circuit comprising:

a split-pentode vacuum tube having first and second signal amplifying halves and a common signal input electrode;

first means for applying said chrominance portion and said bursts to said input electrode for amplification by said tube;

second means responsive to said synchronizing pulses for generating positive and negative polarity flyback pulses coinciding in time with said bursts;

third means for applying said negative flyback pulses to said first amplifying half for rendering said half inoperative during the color burst interval of said video signal when said bursts are applied to said input electrode;

and fourth means for applying said positive flyback pulses to said second amplifying half for rendering said half inoperative during the chrominance signal interval of said video signal when said chrominance portion is applied to said input electrode.

2. In a color television receiver adapted to receive a video signal including during each scan line a luminance portion and a chrominance portion, and including between successive scan lines a synchronizing pulse and a burst of oscillations at a color carrier frequency, a combination chrominance amplifier, burst amplifier, and burst gate circuit comprising:

a split-pentode vacuum tube having a control grid and first and second signal amplifying halves, each half having a suppressor grid and an anode;

first means for applying said chrominance portion and said bursts to said control grid for amplification by said tube;

second means responsive to said synchronizing pulses for generating positive and negative polarity flyback pulses coinciding in time with said bursts;

third means for applying said negative flyback pulses to said first half suppressor grid during said color burst interval when said bursts are applied to said control grid for preventing translation of said bursts to said first half anode;

and fourth means responsive to said positive flyback pulses for applying negative pulses to said second half suppressor grid during said chrominance signal interval when said chrominance portion is applied to said control grid for preventing translation of said portion to said second half anode.

3. A combination chrominance amplifier, burst amplifier, and burst gate circuit according to claim 2 in which said fourth means includes a resistance-capacitance network which presents a first time constant to said positive flyback pulses during said color burst interval when said bursts are applied to said control grid and which presents a second, substantially greater time constant to said flyback pulses during said chrominance signal interval when said chrominance portion is applied to said grid.

References Cited

UNITED STATES PATENTS 2,894,059 7/1959 Davis ———— 178—5.4
3,270,127 8/1966 Hansen ———— 178—5.4

RICHARD MURRAY, Primary Examiner